United States Patent [19]

Krause et al.

[11] Patent Number: 4,469,592
[45] Date of Patent: Sep. 4, 1984

[54] POWER SIEVE WITH SCREEN BEATERS

[75] Inventors: Rudolf Krause, Bad Homburg; Günter Sapp, Radevormwald, both of Fed. Rep. of Germany

[73] Assignee: "Rhewum" Rheinische Werkzeug- und Maschinenfabrik GmbH, Remscheid, Fed. Rep. of Germany

[21] Appl. No.: 406,955

[22] Filed: Aug. 10, 1982

[30] Foreign Application Priority Data

Aug. 28, 1981 [DE] Fed. Rep. of Germany ....... 3134116
Sep. 9, 1981 [DE] Fed. Rep. of Germany ....... 3135676
Mar. 20, 1982 [DE] Fed. Rep. of Germany ....... 3210290

[51] Int. Cl.³ .................................................. B07B 1/28
[52] U.S. Cl. .................................... 209/322; 209/367; 209/382
[58] Field of Search ............... 209/322, 382, 330, 367, 209/357

[56] References Cited

U.S. PATENT DOCUMENTS

| 133,662 | 12/1882 | Mowry | 209/330 X |
| 356,329 | 1/1887 | Phillips | 209/330 |
| 663,800 | 12/1900 | Virgin | 209/357 |
| 773,900 | 11/1904 | Soder | 209/367 X |
| 1,491,432 | 4/1924 | Stebbins | 209/367 |
| 1,668,984 | 5/1928 | Simpson | 209/367 X |
| 1,705,619 | 3/1929 | Kendall | 209/367 |
| 1,904,032 | 4/1933 | Roberts | 209/382 X |
| 2,134,240 | 10/1938 | Sowder | 209/382 |
| 2,178,813 | 11/1939 | Shaler | 209/367 |
| 2,537,878 | 1/1951 | Coon | 209/322 X |
| 2,936,064 | 5/1960 | Schuessler | 209/367 X |
| 3,130,831 | 4/1964 | Musschoot | 209/367 X |
| 3,796,311 | 12/1974 | Krause | 209/382 X |

FOREIGN PATENT DOCUMENTS 2133187 1/1973 Fed. Rep. of Germany .

Primary Examiner—Kathleen J. Prunner
Attorney, Agent, or Firm—Karl F. Ross; Herbert Dubno

[57] ABSTRACT

A vibratory power screen normally has a generally planar and longitudinally extending frame having upstream and downstream ends and a pair of laterally spaced side members extending longitudinally between the ends. A generally planar screen is spanned longitudinally within the frame normally between its ends. The entire frame is tilted down from the upstream to the downstream end. Thus when particulate material is loaded onto the screen at the upstream end the particulate material migrates down along the screen to the downstream end with the smaller fractions falling through the screen. This sieve has respective pivot plates rotatably supporting beater shafts on the side members of the frame for rotation about respective substantially parallel adjustment axes extending transversely of the frame underneath the screen. Beater arms, which extend parallel to the screen from the beater shafts, have outer ends which engage the underside of the screen. Each beater shaft has actuation arms extending radially from it and these arms have outer ends pivotally connected to a rigid link. The link is connected to a drive mechanism to effect oscillation of the beater shafts. The adjustment axes are axially alignable with the outer end of the respective actuation arms. The distance between each adjustment axis and the respective beater-shaft axis is the same as the distance between the outer end of the respective actuation arm and the respective beater-shaft axis.

12 Claims, 5 Drawing Figures

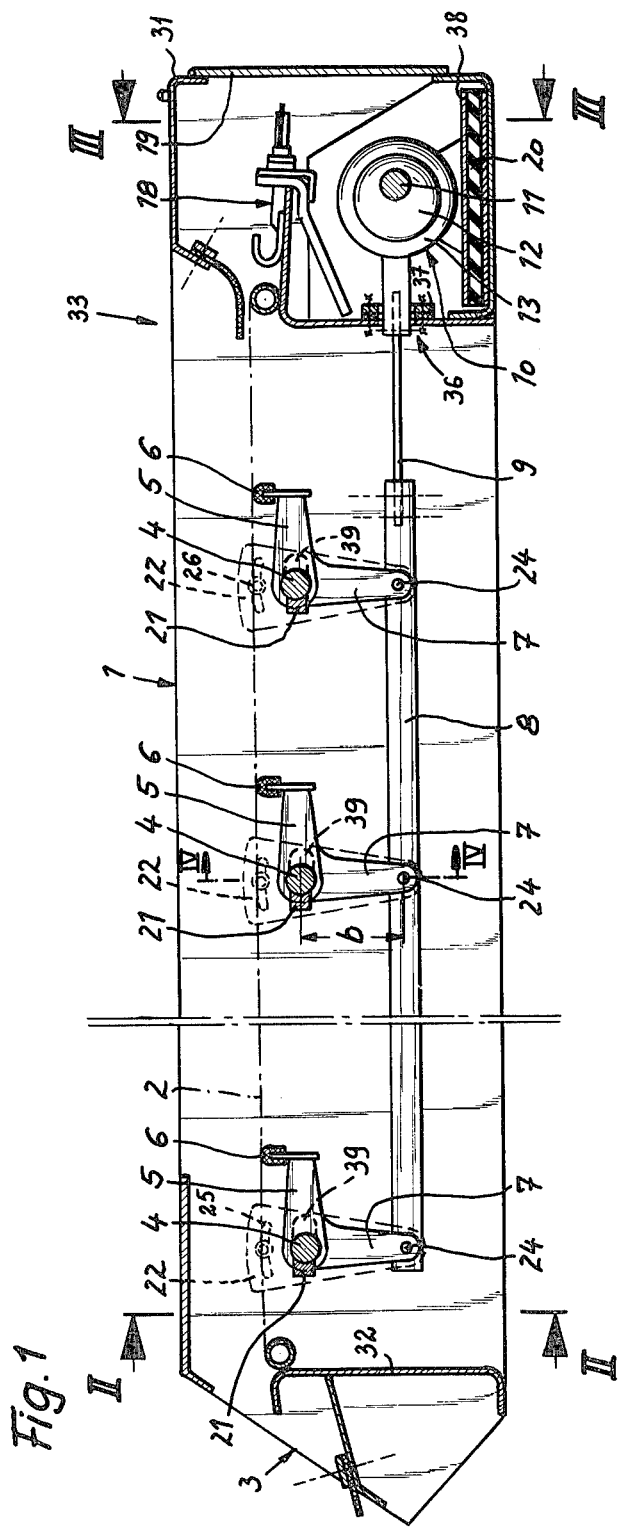

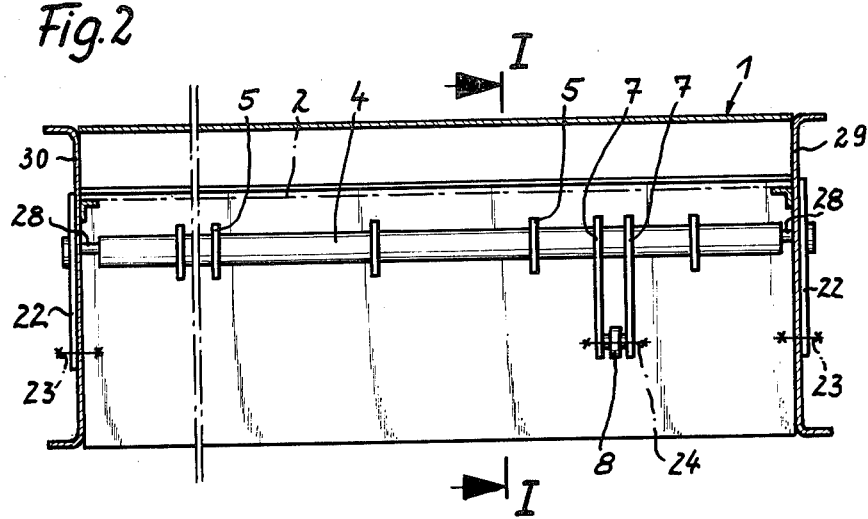
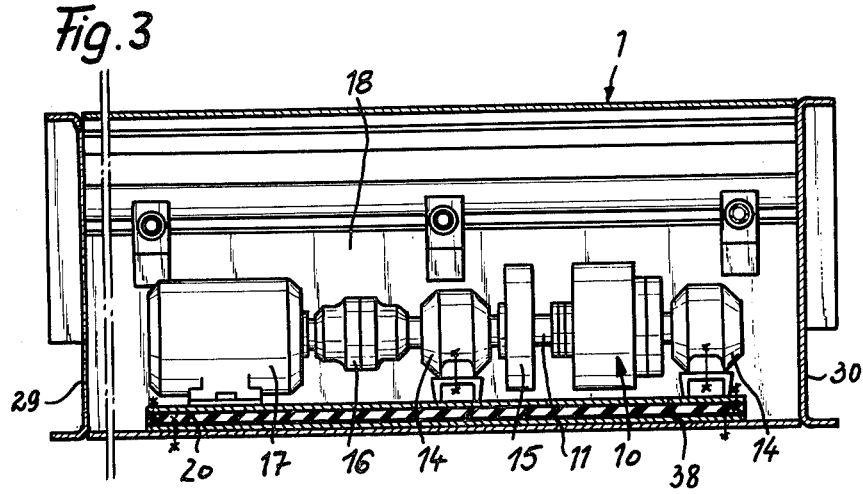

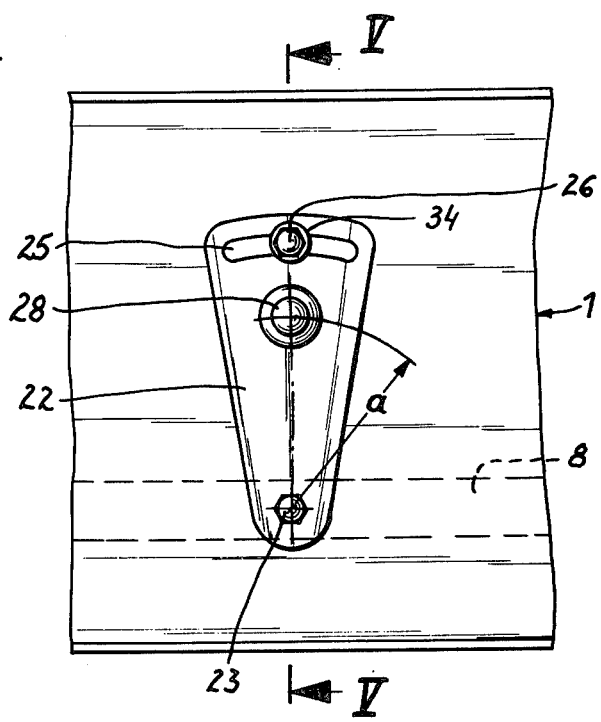
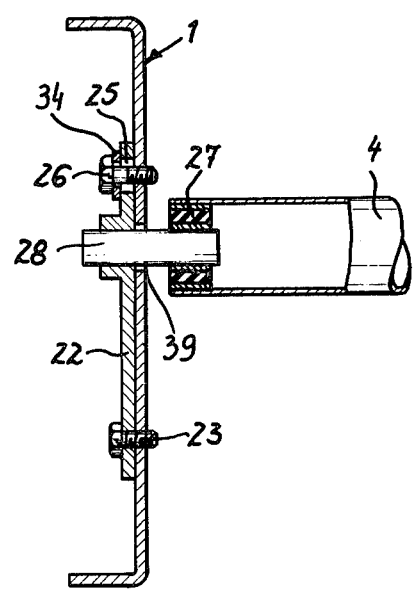

POWER SIEVE WITH SCREEN BEATERS

FIELD OF THE INVENTION

The present invention relates to a vibratory power sieve. More particularly this invention concerns such a sieve having a screen that is beaten to vibrate it.

BACKGROUND OF THE INVENTION

A vibratory power screen normally has a generally planar and longitudinally extending frame having upstream and downstream ends and a pair of laterally spaced side members extending longitudinally between the ends. A generally planar screen is spanned longitudinally within the frame normally between its ends. The entire frame is tilted down from the upstream to the downstream end. Thus when particulate material is loaded onto the screen at the upstream end the particulate material migrates down along the screen to the downstream end with the smaller fractions falling through the screen.

The screen can be vibrated as described in commonly owned U.S. Pat. No. 4,319,993 wherein drive means is provided which includes a pair of drive motors fixed to the central member of the frame and respective eccentrics carried by the motors for limitedly displacing the frame and screen relative to the support. One of the motors is mounted on the high end below the plane of the screen and the other of the motors on the low end above the plane of the screen. In this case the frame is mounted, normally by suspension from stiff hangers, for limited displacement relative to a fixed support. Thus the entire frame and screen are shaken to sieve the material.

It is also known from German patent document No. 2,133,187 to provide the frame with a plurality of longitudinally spaced and substantially parallel beater shafts underneath the screen. Respective beater arms extending generally parallel to the screen from the beater shafts have outer ends engageable with the underside of the screen. Respective actuation arms extending radially from the beater shafts have outer ends all pivoted to a stiff longitudinally extending link. Drive means on the frame connected to the link simultaneously and synchronously pivotally oscillates the beater shafts with the respective beater arms to hammer the outer ends of the beater arms against the screen. In such an arrangement the frame need not be displaceable relative to a fixed support.

The main problem with this type of machine is that the beaters do not act uniformly on the screen, which is desired to make the entire charge on the screen jump and mix, so that the finer fractions work their way down to the screen. Although the machine is set up with the beater-shaft axes all coplanar and parallel to the mesh and with the beater arms all parallel to each other, like the actuation arms, the machine quickly goes out of alignment. If the load is too heavy or the screen too loose, the screen will be lower in the middle than at the ends. Similarly the arms can deform or bearing wear can compound to produce a considerable lack of synchronization in the operation of the beaters.

Another problem with this system is that it generates considerable throw. Shock-mounting the equipment or providing counterbalances has not been effective to make the machine run smoothly and quietly, although it is universally recognized that such running of the machine will greatly prolong its life.

OBJECTS OF THE INVENTION

It is therefore an object of the present invention to provide an improved power sieve.

Another object is the provision of such a power sieve which overcomes the above-given disadvantages.

A further object is to provide a way of adjusting out any errors in syncronization in the screen beating.

Yet another object is to reduce the throw of the machine.

SUMMARY OF THE INVENTION

These objects are attained according to the instant invention in a power sieve of the above-described general type, but that is provided with respective adjustment means supporting the shafts on the side members of the frame for rotation about respective substantially parallel adjustment axes extending transversely of the frame underneath the screen. The adjustment means is comprised of plates rotatably connected at one end to the shafts and to the respective side members at another end at respective adjustment axes for pivoting the beater shafts about the respective adjustment axes that are axially alignable with the outer ends of the respective actuation arms. Thus the distance between each adjustment axis and the respective beater-shaft axis is the same as the distance between the outer end of the respective actuation arm and the respective beater-shaft axis.

Normally each of the beater shafts is supported in two pivot plates. It is therefore possible to adjust each end of each beater until they all are in the same position relative to the mesh. Thus the machine is cranked to a position with most of the beaters engaging the mesh, then those that are too high are lowered slightly and those that are too low are raised. Even a relatively unskilled operator can easily carry out this adjustment.

According to another feature of this invention respective locking means can arrest the pivotal movement of the respective beater in any of a multiplicity of positions angularly offset relative to the respective adjustment axis. Not only does such an arrangement allow a fine adjustment for perfectly synchronous action, but the arrangement of this invention allows the beating action to be varied if desired. Occasionally, for instance, heavy beating action is wanted in the upper regions to break up clumps of material to be sifted, but gentler action is wanted downstream for the actual sifting.

Each adjustment means according to this invention includes an adjustment or pivot plate having one end pivoted on the respective side member at the respective axis and another end rotatably carrying the respective beater shaft. These plates can be on the outside of the side members so that a person standing up next to the machine, even while it is operating, can adjust the respective end of the respective screen beater. In accordance with another feature of this invention each of the plates is formed with an arcuate slot. The locking means includes respective screw fasteners engageable through the slots with the respective side members. A simple bolt passing through the slot and threaded into the side member can be tightened to lock the pivot plate.

Throw and vibration is minimized according to the instant invention by an improved drive means comprising a drive motor carried on the frame, an eccentric transmission connected to the motor, and an elastic but stiff link connected between the eccentric transmission and the rigid link. This transmission includes a disk rotated about an eccentric axis and a follower radially engaging the disk and connected to the flexible link. The elastic link is a longitudinally extending leaf spring or pack of leaf springs. The rigid link therefore stays perfectly parallel to the plane of the beater axes but moves slightly transversely to this plane as it reciprocates back and forth. The follower on the eccentric moves similarly, but through a different vertical distance, depending on the degree of eccentricity of the transmission and the length between each beater shaft and the respective outer-end pivot. The leaf spring transmits force longitudinally between the eccentric follower and this rigid link without creating unwanted vibration.

To make the system as compact as possible and to prevent the drive from bowing the shafts, the actuation arms and rigid links are adjacent one of the side members and the motor is adjacent the other side member. Since the shafts can easily be made torsion stiff, that is untwistable, at the rated torques, they will remain perfectly straight.

The motor according to this invention is an electric variable-speed motor. Since a doubling of the beating rate produces a quadrupling of the acceleration the particles are subjected to, but a doubling of the beating stroke only doubles this acceleration, an adjustable drive speed allows a very wide range of accelerations, which are crucial to power screening, to be created.

The drive means is provided with a flywheel. The frame is provided with a dust-tight housing containing the drive motor and transmission. In addition the housing is formed with a hole through which one of the links passes and is provided at the hole with a dust-tight seal engaging the one link. These parts are therefore shielded against the considerable and frequently abrasive dust generated by sieving. The motor and transmission are carried on a common base plate which itself is supported on the frame on an elastomeric cushion. Thus the motor assembly will not transmit vibration to the entire machine.

The beater shafts according to this invention are tubular and are provided in their ends with cushioned bearings supporting respective pivot pins carried on the respective adjustment plates.

DESCRIPTION OF THE DRAWING

The above and other features and advantages will become more readily apparent from the following, reference being made to the accompanying drawing in which:

FIG. 1 is a longitudinal and vertical section through the sieve apparatus according to this invention;

FIGS. 2 and 3 are sections taken along respective lines II—II and III—III of FIG. 1;

FIG. 4 is a large-scale section taken along line IV—IV of FIG. 1; and

FIG. 5 is a section taken along line V—V of FIG. 4.

SPECIFIC DESCRIPTION

As seen in the drawing a sieve has a frame 1 having longitudinally extending and parallel side beams 29 and 30 bridged by transverse end beams 31 and 32. A screen 2 is stretched longitudinally in the frame 1 between an upstream intake location 33 and a downstream output location 3. In use the entire apparatus is tipped so that the output end 3 is below the input end 33.

Three parallel and longitudinally equispaced beater shafts 4 lie beneath the mesh 2 and extend transverse thereto. As seen in FIG. 5, each of these shafts 4 is tubular for maximum torsional rigidity and minimum weight and is provided in its ends with rubber cushion bearings 27 into which are fitted respective transverse pins 28 carried on adjustment plates 22 pivotal about respective pivot axes 23 on the respective side members 29 and 30. These plates 22 can be pivoted about the respective axes 23 to displace the respective ends of the respective beater shafts 4 generally horizontally on the frame 1. Bolts 26 having washers 34 pass through respective arcuate slots 25 in the plates 22 and are threaded into the respective side beams 29 and 30. These bolts 26 can be screwed down to lock the angular position of the respective plates 22. The side members 29 and 30 are similarly formed with arcuate slots 39 through which the pins 28 pass.

In addition each of the shafts 4 carries a plurality of radially extending and axially aligned beater arms 5 extending upstream generally parallel to the longitudinal plane of the screen 2. Each set of arms 5 carries a transverse beater bar 6 engageable with the underside of the screen 2 at a location somewhat upstream of the respective shaft 4. Diametrally opposite each set of arms 5, each shaft 4 is provided with a counterweight 21.

The shafts 4 also have respective pairs of downwardly extending actuation arms 7 which are considerably closer to the side member 29 than the member 30. These arms 7 have outer ends pivoted at axes 24 on a rigid drive link or beam 8 connected via a stiff but elastically deformable leaf-spring link 9 to a drive 10 at the upstream end of the frame. The axes 24 are, in an intermediate position of the link 8, the centers of curvature for the respective circularly arcuate grooves 25 and 39.

The distance a between each axis 23 and the axis of the respective pivot pin 28 is identical to the distance b between the respective axis 24 and the axis of the respective shaft 4 at the arms 7. In fact in a central position of each plate 22 and of the respective shaft 4 the axes 23 and 24 are coaxial.

The drive 10 is held in a dust-tight housing or chamber 18 at the upstream end of the frame 1, with access to it possible through a removable cover plate 19. It consists of a variable-speed pole-changeable motor 17 mounted on a transversely extending base plate 38 adjacent the side beam 29 and having a transversely projecting output shaft connected through a coupling 16 to a shaft 11 carried in journals 14 fixed on the plate 38. The shaft 11 in turn carries a flywheel 15 and an eccentric disk 12. A ring-type follower 13 surrounds the disk 12 and has an arm projecting through a hole 36 in the housing 18. A seal 37 at this hole 36 prevents dust from getting into the housing 18. The base plate 38 is xounted via a rubber cushion 20 on the floor of the housing 18 so as to transmit minimum vibration to the apparatus.

Thus as the shaft 11 rotates about its axis parallel to the beater shafts 4 the links 8 and 9 will be horizontally reciprocated. This will oscillate the beater assemblies 4–7 about the axes of their respective shafts 4. The hammers or beater bars 6 strike the underside of the screen with each reciprocation, thereby agitating particulate material on the screen 2 so that its finer fraction falls through the screen 2, to be collected underneath the frame 1. The fraction of larger mesh size flows out the downstream end 3.

Under normal conditions the bars 6 should all engage the screen 2 simultaneously. To achieve such operation the apparatus is operated briefly until material is flowing steadily through the machine. The drive 10 is then slowed and stopped with the beaters 6 in a position with most of them just touching the underside of the screen. Those out of contact with the screen 2 are moved up by forward displacement of the ends of their bars 6 toward the downstream end 3 until they just touch the underside of the screen 2. Those that have engaged and lifted the screen are lowered by moving the respective bar ends backward toward the end 33. The bolts 26 are tightened when all of the bars 6 are just touching the bottom of the screen 2. When the device is restarted it will normally operate perfectly, having been adjusted for the particular type of material being treated.

Of course it would be possible to adjust the shafts 4 so that they strike the screen 2 successively, for instance sending a wave downstream along this screen 2. Such adjustment would merely require making the above-given adjustment, then advancing the upstream shaft 4 forward a predetermined increment, as easily read off pointers on the plates 22 and indicia on the side members 29 and 30, and then pulling back the downstream shaft 4 the same increment.

In any case, pivoting each of the shafts 4 through an arc whose radius of curvature a is equal to the distance between each shaft 4 and the respective outer-end pivot 23 completely prevents the system from binding when being adjusted. In addition it allows the adjustment to be made at any angular position of the shaft 4.

We claim:
1. A power sieve comprising:
   a generally planar and longitudinally extending frame having upstream and downstream ends and a pair of laterally spaced side members extending longitudinally between said ends,
   a generally planar screen spanned longitudinally within said frame;
   a plurality of longitudinally spaced and substantially parallel beater shafts underneath said screen;
   respective beater arms extending generally parallel to said screen from said beater shafts and having outer ends engageable with the underside of said screen;
   respective actuation arms extending radially from said beater shafts and having outer ends;
   a rigid longitudinally extending link pivoted on said outer ends of said actuation arms;
   respective pivot plates each having one end rotatably supporting a respective end of one of the shafts and another end pivoted on a respective one of the side members at a respective adjustment axis for angular movement of said pivot plates with the respective shafts about the respective adjustment axes, said adjustment axes extending substantially parallel to one another transversely of said frame underneath said screen and being axially alignable with the outer ends of the respective actuation arms;
   respective locking means for arresting pivotal movement of said pivot plates with the respective beater arms in any of a multiplicity of positions angularly offset relative to the alignment of the outer ends of the respective actuation arms and the respective adjustment axes; and
   drive means on said frame connected to said link for simultaneously and synchronously pivotally oscillating said beater shafts with the respective beater arms to hammer said outer ends of said beater arms against said screen, whereby when said screen is inclined down from said upstream end and particulate material is loaded onto said screen at said upstream end the particulate material migrates down along said screen to said downstream end with the smaller fractions falling through said screen.

2. The power sieve defined in claim 1 wherein each of said plates is formed with an arcuate slot, said locking means including respective screw fasteners engageable through said slots with the respective side members.

3. The power sieve defined in claim 1 wherein said drive means includes:
   a drive motor carried on said frame;
   an eccentric transmission connected between said motor and said rigid link; and
   an elastic but stiff link connected between said eccentric transmission and said rigid link.

4. The power sieve defined in claim 3 wherein said eccentric transmission includes a disk rotated about an eccentric axis and a follower radially engaging said disk and connected to said elastic link.

5. The power sieve defined in claim 3 wherein said elastic link is a longitudinally extending leaf spring.

6. The power sieve defined in claim 3 wherein said motor is an electric variable-speed motor.

7. The power sieve defined in claim 3 wherein said frame is provided with a dust-tight housing containing said drive motor and transmission.

8. The power sieve defined in claim 7 wherein said housing is formed with a hole through which one of said links passes, said housing being provided at said hole with a dust-tight seal.

9. The power sieve defined in claim 3 wherein said motor and transmission are carried on a common base plate.

10. The power sieve defined in claim 9 wherein said frame is provided with an elastomeric cushion supporting said base plate.

11. The power sieve defined in claim 1 wherein said beater shafts are supported in the respective pivot plates on cushioned bearings.

12. The power sieve defined in claim 1 wherein each of said beater shafts is supported in two of the pivot plates.

* * * * *